2,848,296
PROCESS FOR THE BASIC DYEING OF VINYLIDENE CYANIDE INTERPOLYMERS

Hansjörg Heller, Basel, Switzerland, assignor to The B. F. Goodrich Company, New York, N. Y., a New York corporation No Drawing. Application November 17, 1955
Serial No. 547,550

7 Claims. (Cl. 8—55)

This invention relates to methods for enhancing the dyeability of certain types of synthetic fibers, and more particularly relates to a process for dyeing vinylidene cyanide interpolymer fibers involving the use of certain specific aromatic acids in basic dye baths as promoters to improve the pickup of the basic dyes by the fibers.

Vinylidene cyanide fiber-forming interpolymers are described in U. S. Patents Nos. 2,615,865 through 2,615,880, 2,628,954, 2,650,911, 2,654,724, 2,654,728, 2,657,197, 2,716,104 through 2,716,106, and in copending applications Serial Nos. 402,823, filed January 7, 1954, now Patent No. 2,786,046, and 407,595, filed February 1, 1954, now abandoned. As described therein, synthetic fibers spun from such interpolymers possess unusually high strength and other desirable properties.

To be of value to the trade, however, any synthetic fiber produced must be readily and successfully dyeable, preferably with the dyes and techniques currently in use. Like many hydrophobic synthetic fibers and filaments, those made from vinylidene cyanide interpolymers have slick, smooth surfaces and are resistant to penetration by ordinary dyestuffs. Further, these polymeric fibers offer a minimum of points or molecular groups to which dye molecules may become affixed. Heretofore, the dyeing of vinylidene cyanide interpolymer fibers with basic dyes alone has produced weakly colored fibers lacking in attractiveness and in resistance to laundering.

One expedient to encourage dye penetration is to open the fiber structure by the action of a swelling agent. Swelling agents are often applied to the fibers before the fibers are immersed in the dye bath, or they may be added directly to the dye bath. Phenylphenol, benzoic acid and mono-chlorobenzene have been used in pre-dye treatments. Swelling agents useful for incorporation into the dye bath include: aromatic amines such as aniline, p-chloroaniline, alpha-napththylamine and m-toluidine, nitroaromatic compounds such as p-nitrotoluene, o-nitrotoluene, nitrobenzene, m-dinitrobenzene and p-nitrodiphenyl as well as methyl salicylate, salicylic acid, chlorosalicyclic acid, quinoline, isoquinoline, acetophenone, chloroacetophenone, N,N-diphenyl formamide, N,N-diphenyl acetamide and benzaldehyde. The use of these and similar materials, however, can result in increased cost and may require extra care in handling to avoid the effects of odious and toxic vapors.

Basic dyes are salts of colored organic cations with simple anions, which are usually inorganic in nature. In a basic dye this positive charge is found to be directly connected with the color of the dye, and destruction of the charge always results in loss of color. The charge has been found to be distributed over a large area of the cation of a basic dye, which results in an unusually small electrostatic potential of this dye cation. On hydrophilic fibers such as wool and silk, basic dyes are largely fixed by an ion exchange mechanism:

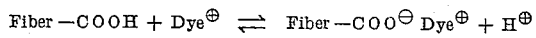

The ionic mechanism is always complemented by adsorption of the dye within the fiber structure. In the case of many synthetic fibers adsorption becomes very important since only a few incidental carboxyl groups are found in these fibers. Vinylidene cyanide:vinyl acetate copolymer fibers, a prime example of vinylidene cyanide interpolymer fibers present an even greater dyeing problem since they contain no carboxyl groups and hence there is no driving force or ionic charge to help the dye enter the fibers. Weak, easily scoured off colorings result from attempts to apply basic dyes to these fibers.

In considering this problem I have postulated that the carboxyl groups do not have to be tied to the polymer chains to bring about dye fixation and that certain aromatic acids useful as developers for basic dyes should be capable, when applied to vinylidene cyanide:vinyl acetate copolymer fiber either before dyeing or right in the dye bath, of fixing basic dyes in the fiber. In order that an acid be suitable for this purpose, it should be able to penetrate the fiber to be dyed and simultaneously to form an insoluble lake with the basic dye. This mechanism is entirely different from the action of the swelling agents set out above. A conventional swelling agent opens up the fiber structure and allows a more rapid establishment of normal distribution equilibrium of the dye between dye bath and fiber. A swelling agent acts on the fiber, whereas the acid developer should interact with the dye itself.

This invention represents the successful application of this approach to the problem.

An object of this invention is to provide an economical process for treating vinylidene cyanide interpolymer fibers to render them more readily dyeable with basic dyes. Another object is to provide a process of dyeing vinylidene cyanide interpolymer fibers that will not require expensive materials, high temperatures, or potentially toxic concentrations of chemicals.

Yet another object is to provide vinylidene cyanide interpolymer fibers, filaments, yarns and fabrics, which are dyeable with standard, commercially available, basic dyes; which possess, when so dyed, light, cleaning and laundering fastness comparable to dyed woolen fibers and fabrics.

Still another object is to provide materials which when added to a basic dye bath enter the synthetic fibers to be dyed and in turn react with the dye to form an insoluble lake or color which is fast to scouring.

These and other objects are attained according to this invention by treating vinylidene cyanide interpolymer fibers with an aromatic acid selected from the group consisting of 2-hydroxy-3-naphthoic acid (also known as beta-hydroxynaphthoic acid) and N-beta-naphthyl-beta-alanine and dyeing the fibers with a basic dye. The fibers may be treated with the acid developer immediately after the fibers are formed, as by spinning a solution of the polymer through a spinnerette and then passing the filaments so formed through a developer bath and then to the dye bath, or, alternatively, and more simply, the developer may be added directly to the dye bath and the dye applied to the fibers, or yarns, or fabrics made therefrom, at any other desired time. It is desirable, but not essential, that a conventional swelling agent also be present in the dye bath.

When a number of other aromatic acid developers are used in place of 2-hydroxy-3-naphthoic acid and N-beta-naphthyl-beta-alanine it is sometimes possible to achieve better dyeing results than when either the basic dye or basic dye plus swelling agent is used alone, but the depth of shade and brilliance of hue in the color of the dyed fibers is discovered to be outstandingly superior when either 2-hydroxy-3-naphthoic acid or N-beta-naphthyl beta-alanine is used. Other aromatic acids tested as promoters of basic dyeing of vinylidene cyanide interpolymer fibers include: benzoic acid, phthalic acid, p-hydroxy benzoic acid, salicylic acid, p-amino benzoic acid, anthranilic acid, and 2-naphthoic acid, among others. Acetic acid has also been found to give results comparable to these aromatic acids.

Beta-hydroxynaphthoic acid or N-beta-naphthyl-beta-alanine gives good results in the practice of this invention when added to a standard wool dye bath at a concentration of 2% to 20% on weight of fabric (o. w. f.) with a preferred range of 8% to 12% o. w. f. being used in most cases. The use of a swelling agent along with the acid developer is preferred, for as shown later, the two provide a synergistic action; better dyeing results being obtained when both are used than when either developer or swelling agent is used alone with a basic dye.

As a class, basic dyes have higher affinity for hydrophobic fibers than do other water-soluble dyes. The basic dyes found on the market today (Astrazones, Genacryls and Sevrons) have been formulated to give good light fastness on hydrophobic fibers. They do not, however, impart enough color to vinylidene cyanide interpolymer fibers to give acceptable fabrics when used without dye bath additives.

Basic dyes are applied to textile materials by dissolving the dye in water in dye bath vats to form a dye liquor, usually at a ratio of one part of textile to 10 to 80 parts of dye liquor, and usually at a concentration of 0.2 percent for light colors (e. g. yellows) to 10 percent for extremely dark colors (e. g. blues, or blacks) of dye on weight of fabric (o. w. f.) to be dyed. The fabric to be dyed is usually placed in the dye bath liquor at room temperature and the bath is quickly heated to a boil. Pressure systems are sometimes used to obtain higher bath temperatures. From the dye bath, the colored textiles are transferred to rinsing and scouring baths which remove all residual traces of the dye liquor, and then to driers which remove all moisture.

Any vinylidene cyanide interpolymer may be used. Such interpolymers contain

groups in their structure, and the preferred interpolymers are bicomponent interpolymers in which the vinylidene cyanide residue shown alternates in 1 to 1 molar ratio with the residue of the comonomers. Specific vinylidene cyanide interpolymers which may be used are disclosed in the patents and patent applications set forth in the second paragraph hereof, the disclosures of which are incorporated herein by reference. The most preferred interpolymer is the 1 to 1 molar interpolymer of vinylidene cyanide with vinyl acetate.

Advantages which may be cited for the synthetic materials dyed by the process of this invention include complete penetration of the dye into the fiber, and no change in hand or feel of the fabric.

The examples given below are intended only to illustrate the striking advantages of this invention and are not to be construed as a limitation upon the scope thereof, for there are, of course, numerous possible variations and modifications that will be apparent to those skilled in the art. In the examples all parts are by weight.

*Example 1*

A supply of 100 percent vinylidene cyanide:vinyl acetate copolymer yarn was prepared following the teachings of U. S. Patent 2,615,866. The yarn was woven into a fabric, bleached in a mixture of sodium chloride and oxalic acid to remove dirt and any residual color cast, then cut into inch square pieces for dyeing tests. Each inch square piece of fabric weighed approximately 4.0 grams.

Sufficient dispersion of 2-hydroxy-3-naphthoic acid was made by mixing acid, wetting agent, and water at the ratio of 0.8 gram of acid, 0.1 gram of sodium N-methyl-oleoyl taurate and 130 grams of water in a laboratory blender to provide 40 grams of dispersion for each gram of fabric in the test beakers. The proper amount of dispersion was added to each beaker and the beakers were covered with watch glasses to reduce loss of material by steam distillation as the contents were heated to boiling and held at that temperature for one-half hour. Then 0.2 gram of a basic dye, dissolved in 30 grams of water was added to each beaker and the bath was held at boil for one more hour. The dye concentration was 5 percent o. w. f.

After a thorough cold water rinse, the dyed pieces were scoured by boiling for 15 minutes in a water solution containing 2 percent sodium N-methyl-oleoyl taurate and 2 percent sodium pyrophosphate, and 15 minutes in a water solution containing 2 percent sodium N-methyl-oleoyl taurate and 2 percent sodium hydroxide.

Each of the fabric pieces was uniformly dyed to a deep shade of the color produced by the dye or mixture of dyes used. In a run where only dye with no 2-hydroxy-3-naphthoic acid was used, the test pieces dyed to a very weak shade of the dye used and all color was removed from them by the scourings. Dyes tested included:

Sevron Brilliant Red 4G
Sevron Blue 2G
Sevron Green B
Genacryl Yellow 3G
Genacryl Orange G
Genacryl Red GB
Genacryl Blue 6G
Genacryl Blue 6G ⅓ Blue-Green
Genacryl Yellow 3G ⅓ Blue-Green
Sevron Green B ⅓ Blue-Green
Genacryl Red 6B ⅓ Purple
Genacryl Orange G ⅓ Purple
Sevron Green B ⅓ Purple
Genacryl Yellow 3G ½ Orange
Sevron Brilliant Red 4G ½ Orange Colors fast to alkaline scour were produced on the synthetic fibers using basic dyes and beta-hydroxynaphthoic acid.

*Example 2*

Inch square pieces of vinylidene cyanide:vinyl acetate fabric weighing about 4 grams were placed in beakers, separately covered with 160 grams of dispersions of various additives at an additive concentration of 10 percent o. w. f. and heated at boil for one hour. Next Sevron Brilliant Red 4G basic dye was added, and the bath boiled under watch glasses for one hour. Following the dyeing step were a cold water rinse and one 15 minute alkaline scour also at a bath ratio of 40 to 1.

The proportions used for each beaker and step were:

| Step: | Proportions |
|---|---|
| Dyeing | 3 percent Sevron Brilliant Red 4G. 10 percent additive. |
| Scouring | 2 percent sodium N-methyl-oleoyl taurate. 2 percent sodium hydroxide. |

Percents are on weight of fabric (o. w. f.). Listed below are the additives used and visual evaluation of the color produced:

| Additive: | Color produced |
|---|---|
| Control—no additive | Very pale pink. |
| Beta-hydroxynaphthoic acid | Brilliant red. |
| N-naphthyl-beta-alanine | Red. |
| Acetic acid | Lighter than control. |
| o-Nitrotoluene | Slightly darker than control. |
| Acetophenone | Same as control. |
| Beta-naphthol | Very slightly darker than control. |
| Beta-naphthoic acid | Slightly darker than control. |
| Anthranilic acid | Same as control. |

Example 3

The procedure of Example 2 was followed using Genacryl Blue GG dye in place of Sevron Brilliant Red 4G. Instead of one scour as in Example 2, two scours as described in Example 1 were given to each dyed piece of fabric. Listed below are the additives used and visual evaluation of the color produced:

Swelling agent: | Color produced
--- | ---
Control (no additive) | Light blue.
Beta-hydroxynaphthoic acid | Deep blue.
N-naphthyl-beta-alanine | Deep blue.
Acetic acid | Slightly darker than control.
o-Nitrotoluene | Light blue.
o-Phenylphenol | Light blue.
Salicylic acid | Light blue.
p-Hydroxy benzoic acid | Light blue.
Benzoic acid | Light blue.
Beta-naphthoic acid | Darker than control.
Phthalic acid | Light blue.

These examples show that vinylidene cyanide:vinyl acetate copolymer fabric can be dyed to pale shades, which are not scour fast, by basic dyes alone, or with additives which are merely swelling agents, but deep shades of color which are scour fast are obtained when beta-hydroxynaphthoic acid or N-beta-naphthyl-beta-alanine is used as the additive.

Example 4

Five dyeings were made of inch square, 4 gram pieces of vinylidene cyanide:vinyl acetate fabric for each of eleven dyes, four of which were acetate dyes and seven of which were basic dyes. Various additives were made up into dispersions by dissolving 2.5 grams of the agent in 25 grams of ethyl alcohol and pouring this solution into a solution of 0.025 gram of sodium N-methyl-oleoyl taurate in 100 grams of water. Next 0.5 gram of octyl alcohol was added and the dispersion was diluted to 250 ml. 40 ml. of this final dispersion per gram of fabric gave a ratio of 10 percent o. w. f. of the swelling agent. Dye solutions or dispersions were prepared by shaking 2.0 grams of dye in 200 grams of water. 12 ml. of this solution, equal to 3 percent dye o. w. f. were used per gram of fabric. Dyeing and scouring procedures were the same as those followed in Example 3.

The five dyeings run with each dye included:

(1) No additive (control)
(2) 10 percent o. w. f. beta-hydroxynaphthoic acid
(3) 10 percent o. w. f. N-naphthyl-beta-alanine
(4) 10 percent o. w. f. o-nitrotoluene
(5) 10 percent o. w. f. o-phenylphenol The depth of shade of each sample obtained with each dye was rated visually from 1 to 5, 1 being lightest; 5 being deepest.

A summing of the ranks assigned to each dye for each additive gave the final ranking of the additives, those having highest count being most effective:

| Dye (type) | Control, No additive | 10% beta-hydroxy-naphthoic acid | 10% N-beta-naphthyl-beta-alanine | 10% o-nitro-toluene | 10% o-phenyl-phenol |
|---|---|---|---|---|---|
| Celanthrene Pure Blue BRS (acetate) | 1 | 2 | 3 | 4 | 5 |
| Celanthrene Red 3BN (acetate) | 1 | 3 | 3 | 3 | 5 |
| Celanthrene Fast Yellow GL (acetate) | 1 | 3 | 2 | 4 | 5 |
| Latyl Red B (acetate) | 1 | 3 | 2 | 4.5 | 4.5 |
| Sum of ranks (acetate dyes) | 4 | 11 | 10 | 15.5 | 19.5 |
| Genacryl Yellow 3G (basic) | 1 | 5 | 4 | 2.5 | 2.5 |
| Sevron Green B (basic) | 1 | 5 | 2 | 3.5 | 3.5 |
| Sevron Brilliant Red 4G (basic) | 1 | 5 | 4 | 2.5 | 2.5 |
| Genacryl Red GB (basic) | 1 | 4.5 | 4.5 | 2.5 | 2.5 |
| Genacryl Orange G (basic) | 1 | 5 | 3 | 3 | 3 |
| Genadryl Blue 6G (basic) | 1 | 5 | 3 | 3 | 3 |
| Sevron Blue 2G (basic) | 1 | 5 | 2 | 4 | 3 |
| Sum of ranks (basic dyes) | 7 | 34.5 | 22.5 | 21 | 20 |

All of the additives used in Examples 2 and 3 except the two materials of this invention, beta-hydroxynaphthoic acid and N-beta-naphthyl-beta-alanine, have been previously known as swelling agents for use with acetate dyes. Examples 2 and 3 illustrate that the previously known swelling agents have some beneficial effect when used with basic dyes on vinylidene cyanide:vinyl acetate fabric, but do not give the deep colors that are produced when the materials of this invention are used. Example 4 has illustrated that the effect of beta-hydroxynaphthoic acid and N-beta-naphthyl-beta-alanine is specific for basic dyes; they are only moderately effective as swelling agents for acetate dyes and cannot be classed as general swelling agents. It is believed that these naphthoic acids react with basic dyes forming new dyes, which in turn show improved attraction to vinylidene cyanide:vinyl acetate synthetic fibers and fabrics.

Example 5

Dispersions of beta-hydroxynaphthoic acid were prepared as in Example 1. Sevron Green B was selected as a representative basic dye and inch square, 4 gram pieces of vinylidene cyanide:vinyl acetate fabric were dyed as in Example 3 using a series of concentrations of additive in percent o. w. f. for each of two concentrations of dye in percent o. w. f. The color shades of the dyed pieces were rated visually as follows:

| Concentration of Sevron Green B, percent o. w. f. | Relative depth of shade additive concentration in percent o. w. f. |
|---|---|
| 6% | 10%>14%>6%>18%>2% |
| 3% | 10%>14%>6%>18%>2% |

Approximately 10 percent of beta-hydroxynaphthoic acid o. w. f. is a preferred concentration for this basic dye promoter through a wide range of dye concentration, although as little as 2 percent and as high as 18 percent of promoter also gives satisfactory dyeing results.

Example 6

A series of four parallel dyeings was run using six basic dyes. Make-up of dispersions and dyeing were carried out as in Example 3. The dyed pieces were inch square, four gram pieces of vinylidene cyanide:vinyl acetate fabric. The dyeing series included:

(1) 4 percent dye o. w. f.
(2) 4 percent dye o. w. f. plus 15% beta-hydroxynaphthoic acid o. w. f.
(3) 4 percent dye o. w. f. plus 40 percent methyl salicylate (a swelling agent) o. w. f.
(4) 4 percent dye o. w. f. plus 15 percent beta-hydroxynaphthoic acid plus 20 percent o. w. f. methyl salicylate The following dyes were used:

Acridene Red
Methylene Blue
Methyl Violet
Genacryl Blue 6G
Genacryl Yellow 3G
Genacryl Red 6B When visually rated for depth of shade produced in the dyed fabric the ranking for each dye was 4>2>3>1. The results of this experiment show the synergistic action of the basic dye promoter of this invention and methyl salicylate, which is a conventional swelling agent. Neither promoter nor swelling agent alone with the dye produces as fine a shade as the two together with the dye.

*Example 7*

When a series of dyeings similar to that in Example 6 was run under pressure at 250° F., the effect of the promoter was even more pronounced. The series included:

(1) 4 percent dye o. w. f.
(2) 4 percent dye o. w. f. plus 7.5 percent o. w. f. beta-hydroxynaphthoic acid
(3) 4 percent dye o. w. f. plus 15 percent o. w. f. beta-hydroxynaphthoic acid
(4) 4 percent dye o. w. f. plus 20 percent o. w. f. methyl salicylate Sevron Brilliant Red 4G and Sevron Green B were the dyes selected. Visual comparison of the dyed samples gave the same ranking for both dyes: 3>2>4>1.

The above examples have shown the unique action of beta-hydroxynaphthoic acid and N-beta-naphthyl-beta-alanine. They are not true swelling agents that open up a fiber structure, but promoters that are believed to react with basic dyes to form new dyes which in turn react with the fiber to give a dyed article of pleasing appearance which is color fast to scouring.

It is not intended that this invention be limited to the specific examples disclosed herein, for various modifications and variations may be employed in the practice of this invention without deviating from its scope. Other vinylidene cyanide copolymers and interpolymers as disclosed in the patents listed in paragraph two herein can be dyed with basic dyes by this technique. Therefore, it is intended that this invention shall be limited and defined only in accordance with the appended claims.

I claim:
1. The process of dyeing vinylidene cyanide interpolymer textiles which comprises treating said textiles with a basic dye in the presence of an additive selected from the class consisting of 2-hydroxy-3-naphthoic acid and N-beta-naphthyl-beta-alanine.

2. The process of dyeing vinylidene cyanide:vinyl acetate copolymer textiles which comprises treating said textiles with a basic dye in the presence of an additive selected from the group consisting of 2-hydroxy-3-naphthoic acid and N-beta-naphthyl-beta-alanine.

3. The process of dyeing vinylidene cyanide:vinyl acetate copolymer textiles which comprises treating said textiles with a basic dye in the presence of from 4 percent to 18 percent on weight of fabric of an additive selected from the group consisting of 2-hydroxy-3-naphthoic acid and N-beta-naphthyl-beta-alanine.

4. The process of dyeing vinylidene cyanide:vinyl acetate copolymer textiles which comprises treating said textiles with a basic dye in the presence of from 4 percent to 18 percent on weight of fabric of 2-hydroxy-3-naphthoic acid.

5. The process of dyeing vinylidene cyanide:vinyl acetate copolymer textiles which comprises treating said textiles with a basic dye in the presence of from 4 percent to 18 percent on weight of fabric of N-beta-naphthyl-beta-alanine.

6. The process of dyeing vinylidene cyanide:vinyl acetate copolymer textiles which comprises treating said textiles with a basic dye in the presence of from 4 percent to 18 percent on weight of fabric of an additive selected from the group consisting of 2-hydroxy-3-naphthoic acid and N-beta-naphthyl-beta-alanine plus from 5 percent to 40 percent on weight of fabric of a second additive selected from the group consisting of methyl salicylate, o-phenylphenol, acetophenone, N,N-diphenylformamide and o-nitrotoluene.

7. The process of dyeing vinylidene cyanide:vinyl acetate copolymer textiles which comprises treating said textiles with a basic dye at a dye bath ratio of 18 to 80 parts dye liquor to 1 part textile, and a dye concentration of from 0.2 to 10 percent of dye per 1 part of textile in the presence of from 4 percent to 18 percent on weight of fabric of an additive selected from the class consisting of 2-hydroxy-3-naphthoic acid and N-beta-naphthyl-beta-alanine, the dyeing being accomplished by holding the dye bath at the equivalent of boiling temperature for at least one hour.

References Cited in the file of this patent

UNITED STATES PATENTS 2,270,706    Heymann _____ Jan. 20, 1942

FOREIGN PATENTS 1,093,276    France _____ May 3, 1955